United States Patent
Rager et al.

(10) Patent No.: US 8,123,296 B2
(45) Date of Patent: Feb. 28, 2012

(54) VEHICLE SEAT ASSEMBLY HAVING MOVABLE BOLSTERS

(75) Inventors: Bernd Rager, Bissingen (DE); Hans Jörg Walk, Reutlingen (DE); Harald Fischer, Unterensingen (DE); Christer Andersson, Trollhättan (SE); Torbjorn Linder, Trollhättan (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/706,069

(22) Filed: Feb. 13, 2007

(65) Prior Publication Data

US 2007/0200405 A1    Aug. 30, 2007

Related U.S. Application Data

(60) Provisional application No. 60/772,741, filed on Feb. 13, 2006.

(51) Int. Cl.
*A47C 7/14* (2006.01)

(52) U.S. Cl. .................... 297/284.3; 297/284.9; 297/248

(58) Field of Classification Search ............... 297/284.3, 297/284.9, 411.29, 248, 284.11
See application file for complete search history.

(56) References Cited

U.S. PATENT DOCUMENTS

| | | | |
|---|---|---|---|
| 4,496,189 A | | 1/1985 | Tanizaki et al. |
| 4,500,136 A | | 2/1985 | Murphy et al. |
| 4,533,175 A | * | 8/1985 | Brennan ........................ 297/232 |
| 4,589,695 A | | 5/1986 | Isono |
| 4,607,887 A | | 8/1986 | Vail |
| 4,636,000 A | | 1/1987 | Nishino |
| 4,720,141 A | * | 1/1988 | Sakamoto et al. ........ 297/284.11 |
| 4,804,221 A | * | 2/1989 | Saiki ............................ 297/284.9 |
| 5,284,379 A | * | 2/1994 | Arnold et al. .................. 297/113 |
| 5,660,437 A | | 8/1997 | Bauer et al. |
| 5,707,109 A | * | 1/1998 | Massara et al. ............. 297/284.9 |
| 5,775,642 A | | 7/1998 | Beroth |
| 5,788,326 A | | 8/1998 | Kawade et al. |
| 6,068,336 A | | 5/2000 | Schönauer |
| 6,203,105 B1 | * | 3/2001 | Rhodes, Jr. ................. 297/284.6 |
| 6,378,941 B1 | | 4/2002 | Opfer et al. |
| 6,547,323 B1 | * | 4/2003 | Aitken et al. ................. 297/113 |
| 6,572,171 B1 | | 6/2003 | Pautz et al. |

(Continued)

FOREIGN PATENT DOCUMENTS

DE    195 22 967 A1    1/1996

(Continued)

OTHER PUBLICATIONS

German Office Action in Case No. 10 2007 007 116.9 dated Jan. 21, 2009.

*Primary Examiner* — Sarah B McPartlin

(74) *Attorney, Agent, or Firm* — MacMillan, Sobanski & Todd, LLC

(57) ABSTRACT

A vehicle bench seat assembly includes a seat bottom including a first seat portion having a seating surface, a second seat portion having a seating surface, and a third seat portion having a seating surface. The seat assembly further includes a seat back including a first back portion, a second back portion, and a third back portion located between the first and second portions. The third seat portion is movable between a first position, wherein the seating surface of the third seat portion is generally flush with the seating surfaces of the first and second seat portions, and a second position, wherein the seating surface of the third seat portion extends in a non-flush position relative to the seating surfaces of the first and second seat portions.

17 Claims, 4 Drawing Sheets

U.S. PATENT DOCUMENTS

| | | | |
|---|---|---|---|
| 6,578,916 B2 | 6/2003 | Longhi et al. | |
| 6,672,666 B2 * | 1/2004 | Stiller et al. | 297/284.2 |
| 6,793,282 B2 * | 9/2004 | Plant et al. | 297/248 |
| 7,055,904 B2 * | 6/2006 | Skelly et al. | 297/284.9 |
| 2004/0017073 A1 * | 1/2004 | Pavlov et al. | 280/806 |
| 2008/0191533 A1 * | 8/2008 | Poniatowski | 297/284.9 |
| 2008/0224511 A1 | 9/2008 | Herkenrath et al. | |

FOREIGN PATENT DOCUMENTS

| | | |
|---|---|---|
| DE | 20109965 U1 | 8/2001 |
| DE | 20022346 U1 | 11/2001 |
| DE | 102005045207 A1 | 3/2007 |
| EP | 1 106 425 A2 | 6/2001 |
| GB | 2 316 608 A | 3/1998 |
| GB | 2 326 589 A | 12/1998 |
| GB | 2 388 313 A | 11/2003 |
| GB | 2 406 507 A | 4/2005 |
| GB | 2 412 849 A | 10/2005 |
| JP | 05228038 A * | 9/1993 |
| JP | 11-253273 | 9/1999 |
| JP | 2005-47378 | 2/2005 |

* cited by examiner

VEHICLE SEAT ASSEMBLY HAVING MOVABLE BOLSTERS

CROSS-REFERENCE TO RELATED APPLICATIONS

This application claims the benefit of U.S. Provisional Application No. 60/772,741, filed Feb. 13, 2006, the disclosure of which is incorporated herein by reference.

BACKGROUND OF THE INVENTION

Many vehicles include a front seat and a back seat. Some rear seats are bench type seats that extend across the virtually the entire width of the vehicle and, therefore, have sufficient room for supporting three seated occupants. Generally, these bench type rear seats have contoured seating positions for either a preferred two-occupant configuration or a three-occupant configuration. A two-occupant bench seat is typically contoured to provide two distinct seating positions, one for each of the two seating positions formed therein, by including left and right bolsters that extend upwardly from a center seating surface. The left and right bolsters provide lateral support for each of the two occupants. These two-occupant bench seats may not provide comfortable seating for three occupants, wherein a third occupant is seated on the center seating surface between the left and right bolsters. Alternatively, a three-occupant bench seat is may be formed having a generally flat seating surface, with little or no bolster contours. Although providing more comfort for a third occupant, these flat bench seats do not provide lateral support for the occupants on the sides thereof.

SUMMARY OF THE INVENTION

This invention relates to a vehicle seat assembly including a seat bottom including a first seat portion having a seating surface, a second seat portion having a seating surface, and a third seat portion having a seating surface. The seat assembly further includes a seat back including a first back portion, a second back portion, and a third back portion located between the first and second portions. The third seat portion is movable between a first position, wherein the seating surface of the third seat portion is generally flush with the seating surfaces of the first and second seat portions, and a second position, wherein the seating surface of the third seat portion extends in a non-flush position relative to the seating surfaces of the first and second seat portions.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
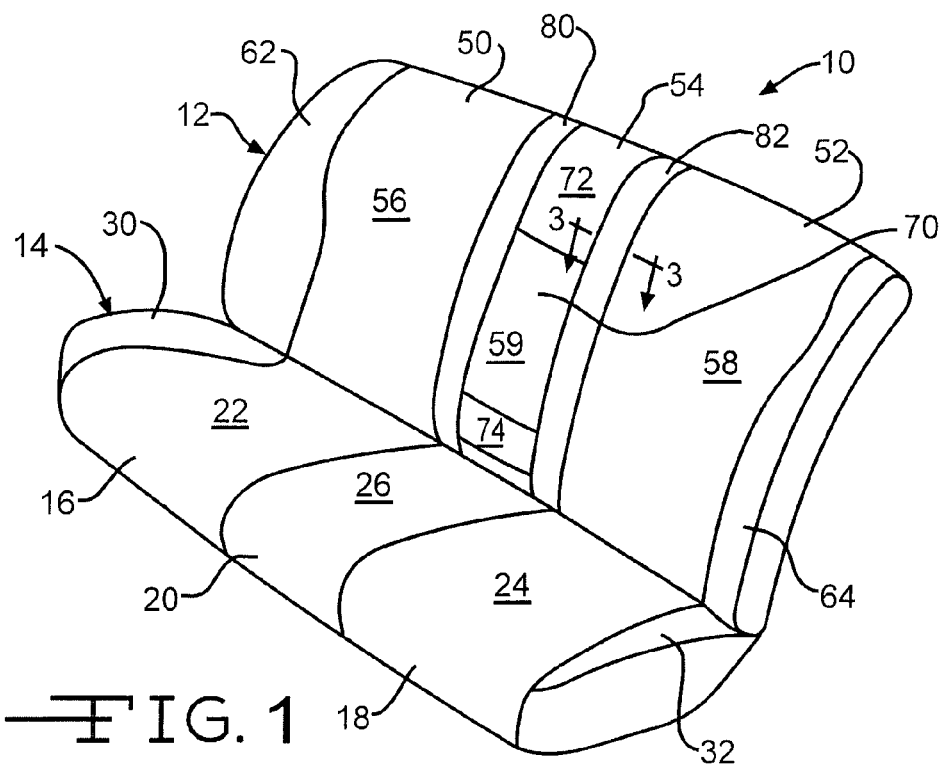
FIG. 1 is a perspective view of a first embodiment of a vehicle seat assembly in accordance with this invention, wherein movable portions of the vehicle seat assembly are shown in retracted positions.

Referring now to FIG. 1, there is illustrated a first embodiment of a vehicle seat assembly, indicated generally at 10, in accordance with this invention. The illustrated vehicle seat assembly 10 is intended merely to illustrate one environment in which this invention may be used. Thus, the scope of this invention is not intended to be limited for use with the specific structure for the vehicle seat assembly 10 illustrated in the drawings or with vehicles in general. On the contrary, as will become apparent below, this invention may be used in any desired environment for the purposes described below. The illustrated vehicle seat assembly 10 is ideally suited for use as a rear bench seat of a vehicle (not shown). However, the seat assembly 10 can be used and mounted within any area of a vehicle.

The vehicle seat assembly 10 generally includes a generally vertically oriented seat back, indicated generally at 12, and a generally horizontally oriented seat bottom, indicated generally at 14. It should be noted that the seat back 12 and seat bottom 14 may be positioned at any suitable angle with respect to each other, preferably at an angle to provide maximum comfort and safety to occupants (not shown). The seat back 10 may also be pivotally mounted relative to the seat bottom 14 such that the seat back 12 may be pivoted forward and downward to a generally horizontal position on top of the seat bottom 14 to for creating a flat load floor and/or to provide access to a trunk compartment behind the seat back 12. The seat back 12 and the seat bottom 14 can be mounted to the vehicle in any suitable manner. Furthermore, the seat back 12 and the seat bottom 14 may be formed from any suitable conventional materials, such as from foam cushions and trim cover material supported on a relatively rigid framework.

Figure 2:
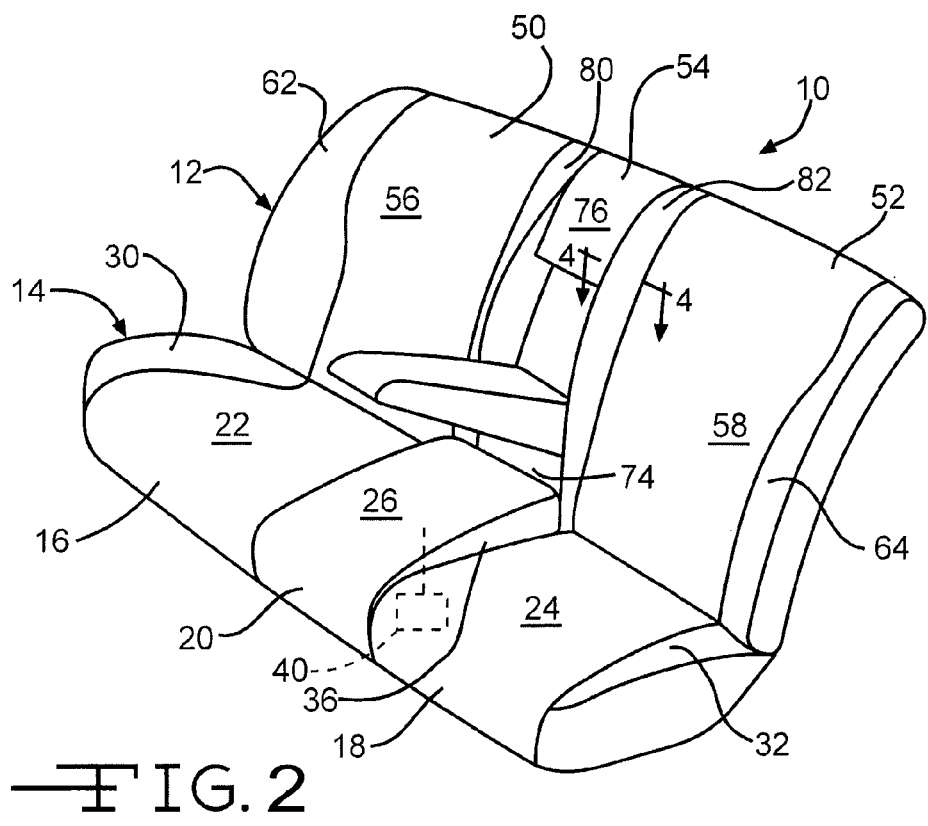
FIG. 2 is a perspective view similar to FIG. 1, wherein the movable portions of the vehicle seat assembly are shown in extended positions.
Figure 3:
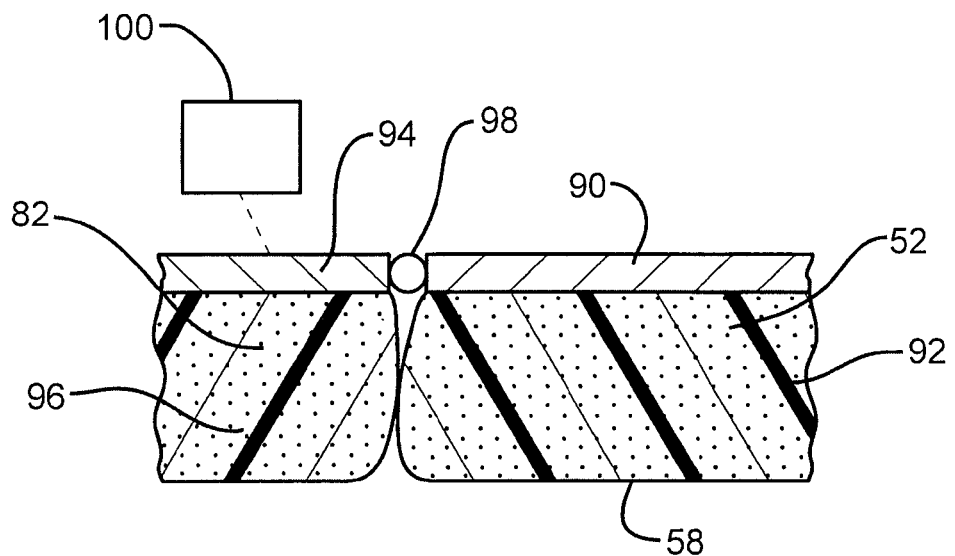
FIG. 3 is an enlarged cross-sectional view of a portion of the vehicle seat assembly in the retracted position taken along line 3-3 of FIG. 1.
Figure 4:
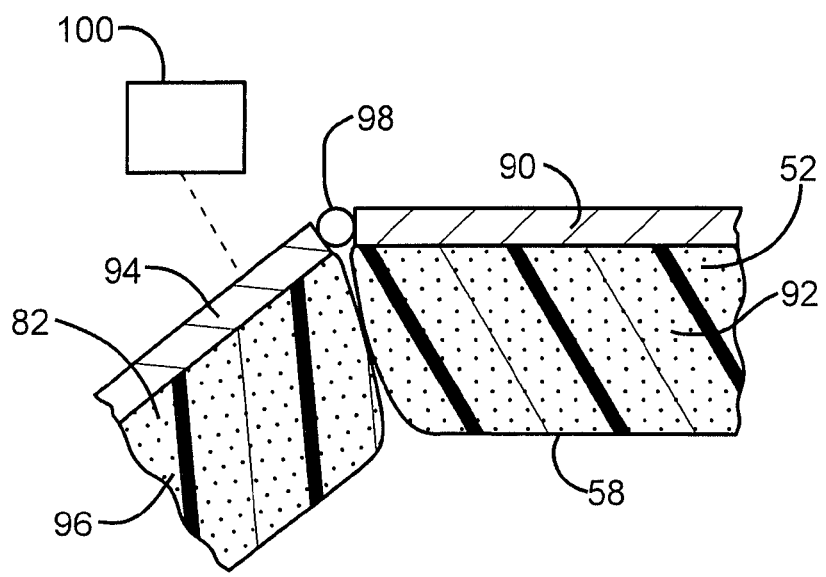
FIG. 4 is an enlarged cross-sectional view of portions of the vehicle seat assembly in the extended position taken along line 4-4 of FIG. 1.

The illustrated seat assembly 10 is a bench-type vehicle seat such that the seat assembly 10 may preferably support three occupants, although such is not required. As will be discussed below, the seat assembly 10 is configurable between a three-occupant configuration, which is shown in FIGS. 1 and 3, and a two-occupant configuration, which is shown in FIGS. 2 and 4. As will be discussed in detail below, in the two-occupant configuration, various portions or bolsters are positioned in extended positions to provide lateral support for two occupants. Thus, the rear type bench seat assembly 10 may be convertible between a relatively flat three-occupant seat to a more contoured two-occupant seat by actuating various movable portions or bolsters provided within the seat back 12 and/or the seat bottom 14.

The seat bottom 14 of the seat assembly 10 includes a first side seat portion 16, a second side seat portion 18, and an intermediate seat portion 20 that is located between the first and second side seat portions 16 and 18. The first side seat portion 16, the second side seat portion 18, and intermediate seat portion 20 define respective seating surfaces 22, 24, and 26. If desired, the first side seat portion 16 may include a first outboard seat bolster 30, and the second side seat portion 18 may include a second outboard seat bolster 32. The first and second outboard seat bolsters 30 and 32 are preferably fixed relative to the first and second side seat portions 16 and 18, respectively, and each have a contoured shape that extends above the seating surfaces 22 and 24, respectively, for providing lateral support for an occupant seated on the first and second side seat portions 16 and 18. The first and second outboard seat bolsters 30 and 32 may, as desired, be provided as either separate structures or integrally formed with the first and second side seat portions 16 and 18. The first and second side seat portions 16 and 18 and the intermediate seat portion 20 are preferably mounted on a common framework (not shown), but may be independently mounted if desired.

The intermediate seat portion 20 of the seat assembly 10 is preferably movably mounted relative to the first and second side seat portions 16 and 18 such that it is movable between a retracted position, which is shown in FIG. 1, and an extended position, which is shown in FIG. 2. In the extended position illustrated in FIG. 2, the seating surface 26 of the intermediate seat portion 20 is positioned above the seating surfaces 22 and 24 of the first and second side seat portions 16 and 18. The intermediate seat portion 20 includes a pair of opposed side surfaces 36 (only one of which is shown) which extend above the seating surfaces 22 and 24 of the first and second side seat portions 16 and 18, respectively, when the intermediate seat portion 20 is positioned in the extended position. Thus, the seating surface 26 of the intermediate seat portion 20 is located in a stepped relationship relative to the seating surfaces 22 and 24 of the first and second side seat portions 16 and 18, respectively. The side surfaces 36 of the intermediate seat portion 20 provide inboard lateral support for occupants seated on the first and second side seat portions 16 and 18. Thus, the side surfaces 36 function similar to the first and second outboard seat bolsters 30 and 32 described above. The side surfaces 36 and the seating surface 26 of the intermediate seat portion 20 may have any desired shape. It is contemplated that when the intermediate seat portion 20 is in the extended position, an occupant will not be seated on the intermediate seat portion 20.

However, when it is desired to have the seat assembly 10 support three occupants, the intermediate seat portion 20 is moved to the retracted position illustrated in FIG. 1 so that an occupant may sit thereon. In the retracted position, it is desirable that the three seating surfaces 22, 24, and 26 be generally flush with one another, and may even extend in a single, general horizontal plane. Thus, for three-occupant seating, the seating surfaces 22, 24, and 26 preferably do not provide lateral support for the three occupants beyond that provided by the first and second outboard seat bolsters 30 and 32.

The intermediate seat portion 20 may be moved between the retracted and extended positions by any suitable mechanism or actuator, such as schematically indicated at 40 in FIG. 2. The illustrated actuator 40 can be used to effect movement of the intermediate seat portion 20 between the retracted and extended positions. Preferably, a separate and conventional locking mechanism (not shown) is provided to positively secure the intermediate seat portion 20 in either or both of the retracted and extended positions. Additionally, the actuator 40 may be capable of positioning the intermediate seat portion 20 in various intermediate positions between the retracted and extended positions. The actuator 40 may be embodied as any suitable mechanism for moving the intermediate seat portion 20 in the desired manner between the retracted and extended positions. For example, the actuator 40 may be an electrical actuator that is responsive to movement of a switch (not shown) for moving the intermediate seat portion 20 between its retracted and extended positions. Alternatively, the actuator 40 may be a mechanical assembly, such as a cable or lever mechanism, or a fluid powered assembly, such as a hydraulic or pneumatic actuator. If desired, the actuator 40 may include one or more air bladders that are selectively inflatable to move the intermediate seat portion 20 between the retracted and extended positions.

The actuator 40 may be either manually or automatically operated, as desired. In a manually operated system, the actuator 40 is responsive to a manually generated input signal, such as by manual movement of a switch or actuating lever. In an automatically operated system, the actuator 40 is responsive to an automatically generated input signal, such as a signal from a condition responsive sensor. For example, the actuator 40 may be responsive to a signal that is automatically generated when a lateral acceleration force or other condition is sensed as being in excess of a threshold value. Additionally, the actuator 40 may be responsive to a signal that is automatically generated upon detection of the number and/or location of occupants seated on the seat assembly 10. To accomplish this, the seat assembly 10 may include weight sensors, proximity sensors, seat belt sensors, or other suitable sensors (not shown) for detecting the presence of the position and/or number of occupants on the seat assembly and for sending a signal to the actuator 40.

The seat back 12 of the seat assembly 10 includes a first side back portion 50, a second side back portion 52, and an intermediate back portion 54 that is located between the first and second side back portions 50 and 52. The first side back portion 50, the second side back portion 52, and the intermediate back portion 54 define respective back surfaces 56, 58, and 59, respectively. If desired, the first side back portion 50 may include a first outboard back bolster 62, and the second side back portion 52 may include a second outboard back bolster 64. The first and second outboard back bolsters 62 and 64 are preferably fixed relative to the first and second side back portions 50 and 52, respectively, and have a shape that extends in front of the back surfaces 56 and 58, respectively, for providing lateral support for an occupant seated on the first and second side back portions 50 and 52. The first and second outboard back bolsters 62 and 64 may be separate structures or integrally formed with the first and second side back portions 50 and 52. The first and second side back portion 50 and 52 and the intermediate back portion 54 are preferably mounted on a common framework (not shown), but may be independently mounted if desired.

The intermediate back portion 54 includes a lumbar section 70, a cervical section 72, and a sacral section 74. The lumbar section 70 is preferably located adjacent to and below the cervical section 72 and preferably adjacent to and above the sacral section 74. As shown in FIGS. 1 and 2, the lumbar section 70 is slightly larger than either the cervical section 72 or the sacral section 74. However, it should be appreciated that the lumbar section 70, the cervical section 72, and the sacral section 74 may be provided having any suitable size or combination of sizes.

Preferably, the cervical section 72 and the sacral section 74 of the intermediate back portion 54 are fixed in position relative to the first and second side back portions 50 and 52, respectively, of the seat back 12. However, the lumbar section 70 of the intermediate back portion 54 is preferably movable relative to the seat back 12 between a retracted position, illustrated in FIG. 1, and an extended position, illustrated in FIG. 2. In the retracted position, the lumbar section 70 of the intermediate back portion 54 is generally flush with the back surfaces 56 and 58 of the side back portions 50 and 52, respectively, and with the cervical section 72 and the sacral section 74 of the intermediate back portion 54. In the extended position, however, the lumbar section 70 pivots downwardly relative to the back surfaces 56 and 58 of the side back portions 50 and 52, respectively, and can function as an armrest for occupants seated in either or both of the first and second side seat portions 16 and 18.

The intermediate back portion 54 further includes first and second inboard back bolsters 80 and 82. The first and second inboard back bolsters 80 and 82 are each movable between a retracted position, illustrated in FIG. 1, and an extended position, illustrated in FIG. 2. In the retracted positions, the first and second inboard back bolsters 80 and 82 are each substantially flush with the back surfaces 56 and 58 of the respective adjacent side back portions 50 and 52, as shown in FIGS. 1 and 3. In the extended positions, the first and second inboard back bolsters 80 and 82 are each moved outwardly from the back surfaces 56 and 58 of the respective adjacent side back portions 50 and 52, as shown in FIGS. 2 and 4.

The structures of the second side back portion 52 and the second inboard back bolster 82 are illustrated in detail in FIGS. 3 and 4. The structures of the first side back portion 50 and the first inboard back bolster 80 and their mode of operation are, in the illustrated embodiment, identical to that of the second side back portion 52 and the second inboard back bolster 82. Thus, a detailed discussion and illustration of same is not required. However, it will be appreciated that if desired, the first side back portion 50 and the first inboard back bolster 80 may have any other desired structure or mode of operation.

As shown in FIGS. 3 and 4, the second side back portion 52 of the seat back 12 includes a rigid frame 90 having a flexible foam cushion 92 provided thereon. Similarly, the second inboard back bolster 82 includes a rigid frame 94 having a flexible cushion 96 provided thereon. The frame 94 of the second inboard back bolster 82 is connected to the frame 90 of the second side back portion 52 by a hinge 98 or any other suitable mechanism for permitting the second inboard back bolster 82 to pivot or otherwise move relative to the second side back portion 52. An actuator 100 is connected to the frame 90 for effective movement of the second inboard back bolster 82 between the retracted and extended positions relative to the second side back portion 52. The actuator 100 may be embodied as any suitable mechanism for accomplishing this, including the various alternatives discussed in connection with the actuator 40.

As best shown in FIG. 3, when the second inboard back bolster 82 is in the retracted position, the surface thereof is substantially flush with the seating surface 58 of the second side back portion 52. When the second inboard back bolster 82 is moved to the extended position, as best shown in FIG. 4, the seating surface thereon is angled forwardly from the seating surface 58 of the second side back portion 52. The flexible nature of the cushions 92 and 96 allows them to be compressed when the second inboard back bolster 82 is moved to the extended position. The angled configuration of the second inboard back bolster 82 provides lateral support for an occupant seated on the second seat and back portions 18 and 52. Alternatively, instead of using a hinged arrangement shown in FIGS. 3 and 4, the second inboard back bolster 82 can be mounted independently of the second side back portion 52 for sliding movement, similar to the movement of the intermediate seat portion 20 described above.

As with the actuator 40 described above, the actuator 100 may be either manually or automatically operated, as desired. Preferably, the actuator 100 is operated in the same manner and at the same time as the actuator 40. However, the actuator 100 may be operated in any desired manner and may be operated independently of the actuator 40.

Figure 5:
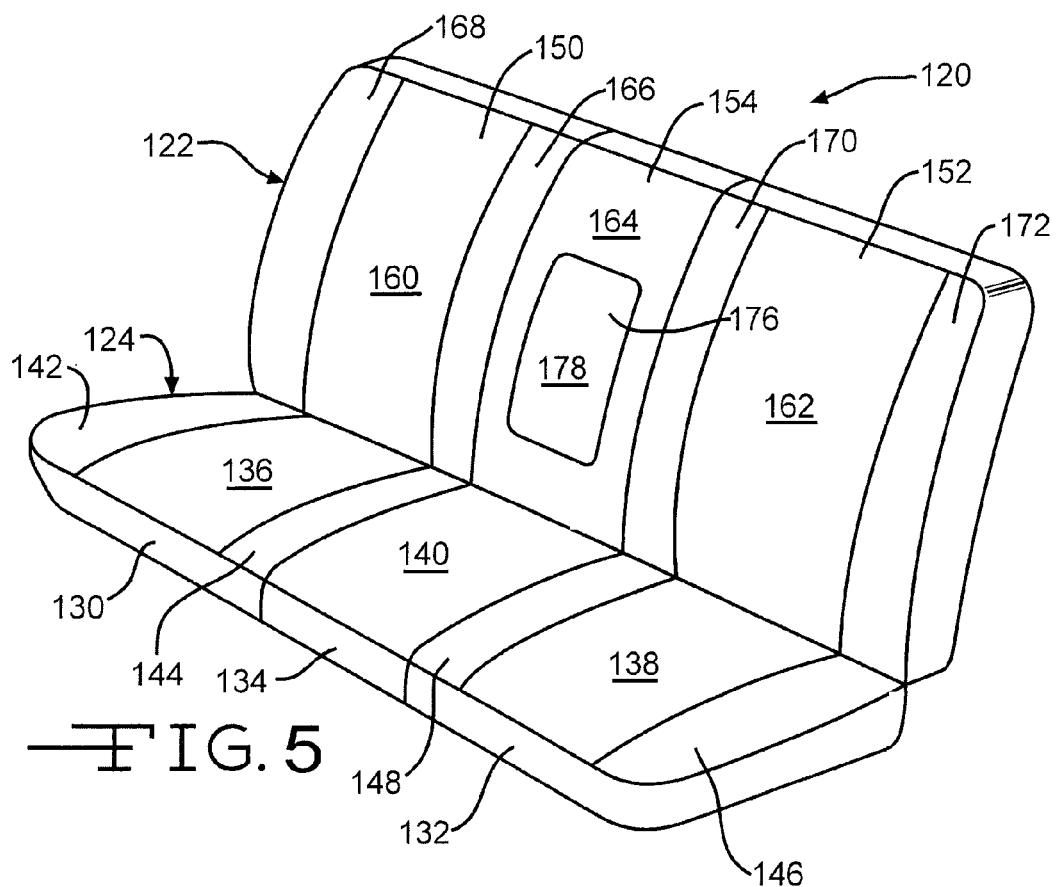
FIG. 5 is a perspective view of a second embodiment of a vehicle seat assembly in accordance with this invention, wherein movable portions of the vehicle seat assembly are shown in retracted positions.
Figure 6:
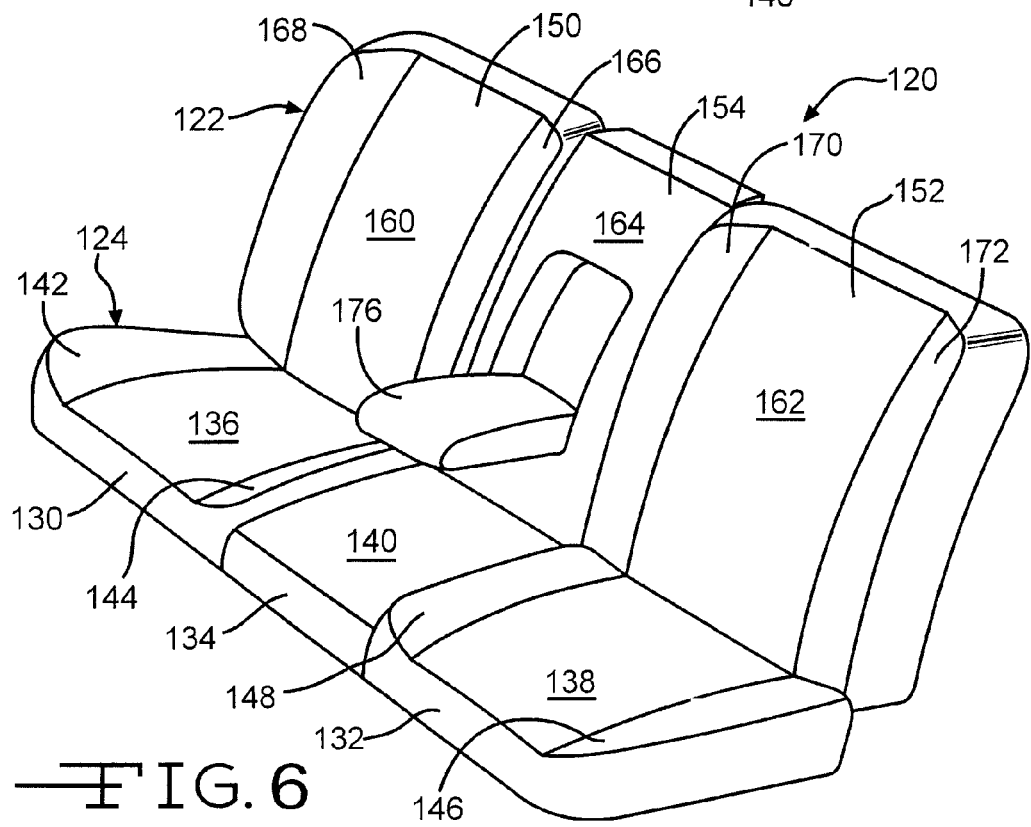
FIG. 6 is a perspective view similar to FIG. 5, wherein the movable portions of the vehicle seat assembly are shown in extended positions.

FIGS. 5 and 6 illustrate a second embodiment of a seat assembly, indicated generally at 120, in accordance with this invention. The second embodiment of the seat assembly 120 is generally similar in function and structure to that of the first embodiment of the seat assembly 10, and it should be understood that the seat assembly 120 may contain any of the features and structures described above with respect to that seat assembly 10. Similar to the first embodiment of the seat assembly 10, the second embodiment of the seat assembly 120 is configurable between a two-occupant and a three-occupant configuration. As will be discussed below, one of the differences from the first embodiment of the seat assembly 12 is that the second embodiment of the seat assembly 120 includes some additional and differently shaped movable portions for providing lateral support for occupants seated thereon.

The seat assembly includes a seat back, indicated generally at 122, and a seat bottom, indicated generally at 124. The seat back 122 and the seat bottom 124 may be formed by any suitable conventional materials, such as from foam cushions and trim cover material supported on a relatively rigid framework. The seat bottom 124 generally includes a first side seat portion 130, a second side seat portion 132, and an intermediate seat portion 134 that is located between the first and second seat portions 130 and 132, respectively. The first side seat portion 130, the second side seat portion 132, and the intermediate seat portion 134 define respective seating surfaces 136, 138, and 140. The first side seat portion 130 includes a first outboard seat bolster 142 and a first inboard seat bolster 144, while the second side seat portion 132 includes a second outboard seat bolster 146 and a second inboard seat bolster 148.

The seat back 122 generally includes a first side back portion 150, a second side back portion 152, and an intermediate back portion 154. The first side back portion 150, the second side back portion 152, and the intermediate back portion 154 define respective seating surfaces 160, 162, and 164. The first side back portion 150 includes a first inboard back bolster 166 and a first outboard back bolster 168, while the second seat portion 152 includes a second inboard back bolster 170 and a second outboard back bolster 172. The intermediate back portion 154 includes a lumbar section 176 that is similar to the lumbar section 60 described above with the respect to the first embodiment of the seat assembly 10. The lumbar section 176 defines a seating surface 178 which forms part of the seating surface 164 of the intermediate back portion 154. The lumbar section 176 is movable between a retracted position, as shown in FIG. 5, and an extended position, as shown in FIG. 6, to function as an armrest.

In the second embodiment of the seat assembly 120, each of the bolsters 142, 144, 146, 148, 166, 168, 170 and 172 is preferably movable between a retracted position, as shown in FIG. 5, and an extended position, as shown in FIG. 6. The bolsters 142, 144, 146, 148, 166, 168, 170 and 172 may be constructed and function similarly to the bolsters 80 and 82 of the first embodiment of the seat assembly 10 described above. Similarly, the bolsters 142, 144, 146, 148, 166, 168, 170 and 172 may be moved by one or more actuators (not shown) that can be similar to the actuators 40 and 100 described above.

When the bolsters 142, 144, 146, 148, 166, 168, 170 and 172 are in the retracted positions, as shown in FIG. 5, the seat assembly 120 is well suited for supporting three occupants. This is because when the bolsters 142, 144, 146, 148, 166, 168, 170 are in the retracted positions, the surfaces thereof are preferably flush with the adjacent seating surfaces 136, 138, 140, 160, 162, and 164 of the seat assembly 120. When the bolsters 142, 144, 146, 148, 166, 168, 170 and 172 are moved to the extended positions, as shown in FIG. 6, the seat assembly 120 is well suited for supporting three occupants. This is because when the bolsters 142, 144, 146, 148, 166, 168, 170 and 172 are in the extended position, the surfaces thereof extend outwardly relative to the adjacent seating surfaces 136, 138, 140, 160, 162, and 164 of the seat assembly 120 and, therefore, provide lateral support of two occupants seated on the first side seat portion 130 and the second side seat portion 132.

If desired, the seat assembly 120 may be configured such that movement of the lumbar section 178 from the retracted position illustrated in FIG. 5 to the extended position illustrated in FIG. 6 automatically causes movement of the bolsters 142, 144, 146, 148, 166, 168, 170 and 172 from the retracted positions to the extended positions. This can be accomplished in a similar manner as described above with respect to the lumbar section 60 of the seat assembly 10. Alternatively, each of the bolsters 142, 144, 146, 148, 166, 168, 170 and 172 and the lumbar section 178 may be moved independently of one another or in any desired combination or group of combinations.

Figure 7:
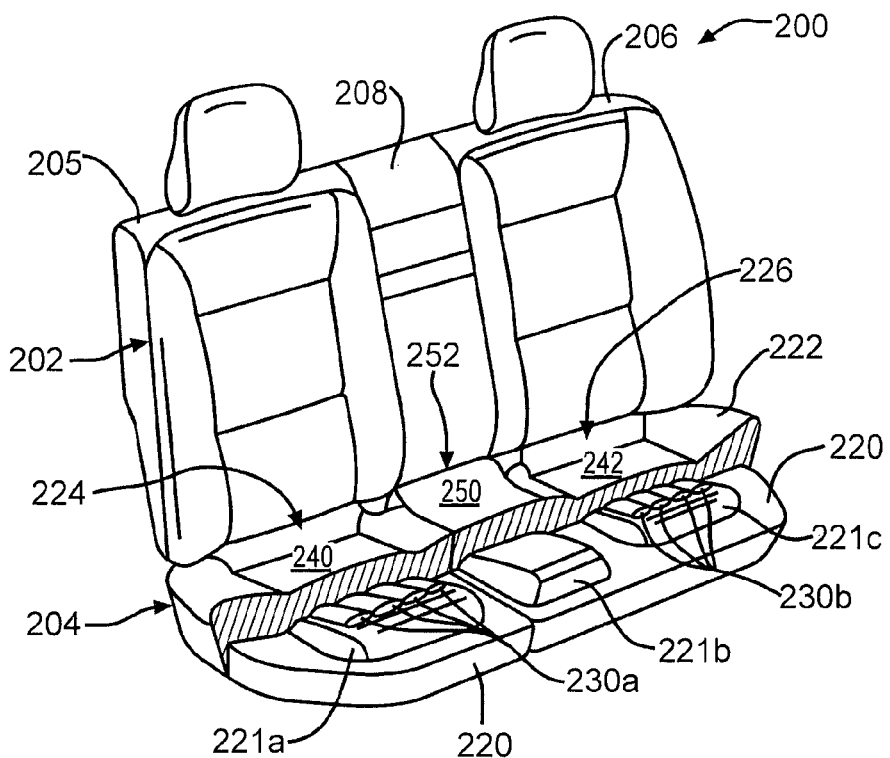
FIG. 7 is a perspective view, partially broken away, of a third embodiment of a vehicle seat assembly in accordance with this invention, wherein movable portions of the vehicle seat assembly are shown in retracted positions.
Figure 8:
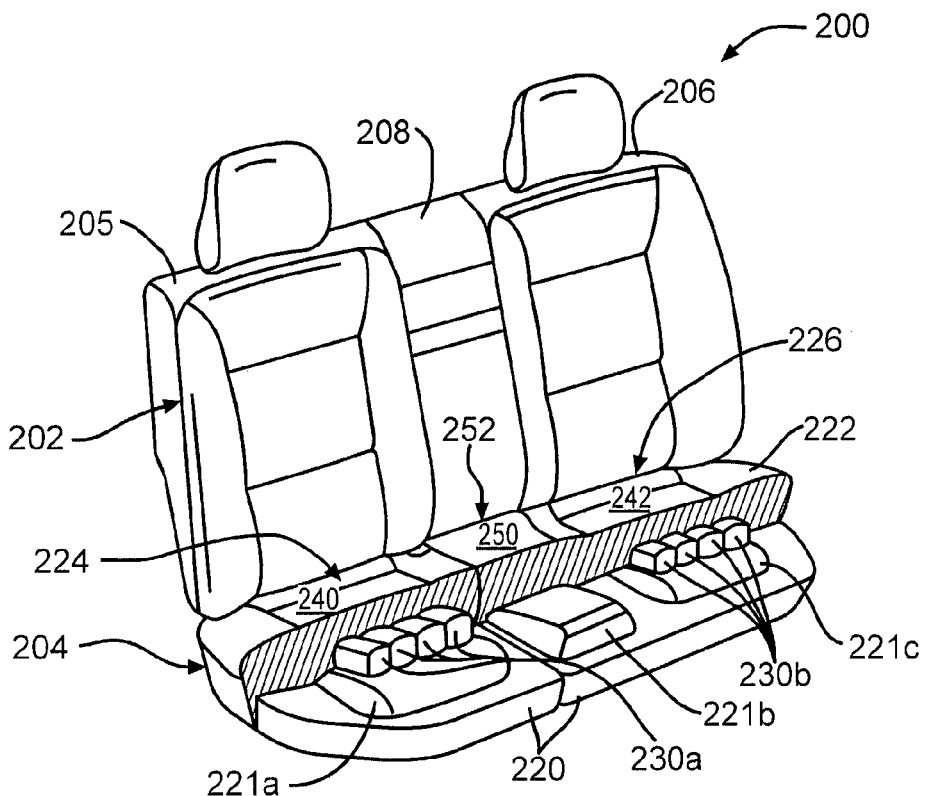
FIG. 8 is a perspective view similar to FIG. 7, wherein the movable portions of the seat assembly are shown in extended positions.

FIGS. 7 and 8 illustrate a third embodiment of a seat assembly, indicated generally at 200, in accordance with this invention. The third embodiment of the seat assembly 200 is also generally similar in function and structure to that of the first embodiment of the seat assembly 10, and it should be understood that the seat assembly 200 may contain any of the features and structures described above with respect to that seat assembly 10. Similar to the first embodiment of the seat assembly 10, the third embodiment of the seat assembly 200 is configurable between a two-occupant and a three-occupant configuration.

The seat assembly 200 generally includes a seat back, indicated generally at 202, and a seat bottom, indicated generally at 204. The seat back 202 includes a first side back portion 205, a second side back portion 206, and an intermediate back portion 208 that is located between the first and second side back portions 205 and 206. In the illustrated embodiment, the seat back 202 does not include any bolsters that are movable between retracted and extended positions for providing lateral support in the manner described above. However, it will be appreciated that the seat back 202 may include one or more of such bolsters such as those described above with the respect to the first and second embodiments of the seat assemblies 10 and 120. The seat back 202 may have any desired shape.

In the illustrated embodiment, the seat bottom 204 includes a pan 220 having a flexible cushion 222 supported thereon. In the illustrated embodiment, the pan 220 and the cushion 222 are formed from two separate structures that are located adjacent to one another. However, the pan 220 and the cushion 222 may be formed from one continuous structure along the entire width of the seat assembly 200 or from three or more separate structures. The cushion 222 may be made of any suitable flexible material, such as a foamed material, and may include an outer trim covering. The illustrated pan 220 has three contoured upper surfaces 221a, 221b, and 221c provided thereon, although such is not required. The three contoured upper surfaces 221a, 221b, and 221c correspond respectively with a first side seat portion indicated generally at 224, an intermediate seat portion indicated generally at 252, and a second side seat portion indicated generally at 226 of the seat assembly 200.

The first side seat portion 224 preferably includes one or more bladders 230a that are provided mounted between the pan 220 and the cushion 222. Similarly, the second side seat portion 224 preferably includes one or more bladders 230b that are provided mounted between the pan 220 and the cushion 222. The bladders 230a and 230b are connected to a controller (not shown) and a source of pressurized fluid (not shown) for selectively inflating and deflating the bladders 230a and 230b. FIG. 7 illustrates each of the bladders 230a and 230b in the deflated state, while FIG. 8 illustrates each of the bladders 230a and 230b in the inflated state. The bladders 230a and 230b, the controller, and the source of pressurized fluid function as an actuator for moving portions of the cushion 222 to form a different profile or contoured shape.

The bladders 230a and 230b may be filled with either liquid or gas, as desired, and may have any suitable shape for providing a desired shape of the cushion 222. It should also be understood that any suitable number of separate bladders 230a and 230b may be provided. Alternatively, the seat assembly 200 may be operated such that some of the bladders are inflated and others of the bladders are deflated to provide a desired contoured surface.

To configure the seat assembly 200 to a three-occupant seating arrangement, the bladders 230a and 230b are inflated to move portions of the cushion 220 upwardly to provide a first shape that is well suited for supporting three occupants, as shown in FIG. 8. When the bladders 230 are inflated in this manner, seating surfaces 240 and 242 of the first and second side seat portions 224 and 226 are moved upwardly into a generally flush arrangement relative to a seating surface 250 of the intermediate seat portion 252. It should be understood that when the seat assembly 200 is in this three-occupant configuration, the seating surfaces 240, 242, 250 need not be in a strict flat planar or linear shape. Rather, it is desirable to move the cushion 222 to a shape which lessens any lateral support for three occupants seated on the seat assembly 200.

To configure the seat assembly 200 to a two-occupant seating arrangement, the bladders 230a and 230b are deflated to move portions of the cushion 220 downwardly to provide a second shape that is well suited for supporting two occupants, as shown in FIG. 7. When the bladders 230 are deflated in this manner, the seating surfaces 240 and 242 of the first and second side seat portions 224 and 226 are moved downwardly out of the generally flush arrangement relative to the seating surface 250 of the intermediate seat portion 252. Thus, the cushion 222 is moved to a shape which increases lateral support for two occupants seated on the seat assembly 200.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A seat bottom for a bench seat assembly comprising:
a first side seat portion having a first seating surface;
a first outboard seat bolster having a lateral side that extends adjacent to the first side seat portion;
a first inboard seat bolster having a first lateral side that extends adjacent to the first side seat portion and a second lateral side;
a second side seat portion having a second seating surface;

a second outboard seat bolster having a lateral side that extends adjacent to the second side seat portion;

a second inboard seat bolster having a first lateral side that extends adjacent to the second side seat portion and a second lateral side; and a generally rectangular intermediate seat portion having a generally rectangular intermediate seating surface and first and second lateral sides, the first lateral side of the intermediate seat portion being directly adjacent to the second lateral side of the first inboard seat bolster, and the second lateral side of the intermediate seat portion being directly adjacent to the second lateral side of the second inboard seat bolster;

wherein all of the lateral sides extend generally parallel to one another;

wherein the bolsters are movable between a retracted position, wherein the bolsters are all in a generally flush position relative to the first and second seating surfaces, and an extended position, wherein the bolsters are all in a non-flush position relative to the first and second seating surfaces; and wherein the entire intermediate seating surface of the intermediate seat portion is fixed in position relative to the bolsters.

2. The seat bottom defined in claim 1 wherein the first side seat portion is generally rectangular in shape.

3. The seat bottom defined in claim 2 wherein the first outboard seat bolster and the first inboard seat bolster are both generally rectangular in shape.

4. The seat bottom defined in claim 1 wherein the first and second side seat portions are each generally rectangular in shape.

5. The seat bottom defined in claim 4 wherein the bolsters are all generally rectangular in shape.

6. The seat bottom defined in claim 1 further including an actuator for moving the bolsters between the retracted and extended positions.

7. The seat bottom defined in claim 6 further including a sensor that generates a signal in response to a sensed condition, and wherein the actuator is responsive to the sensor signal for moving the bolsters between the retracted and extended positions.

8. The seat bottom defined in claim 7 wherein the sensor is responsive to one of lateral acceleration force, the number of occupants seated on the seat bottom, and the location of occupants seated on the seat bottom.

9. A bench seat assembly comprising:
a seat bottom and a seat back, wherein the seat bottom includes:
a first side seat portion having a first seating surface;
a first outboard seat bolster having a lateral side that extends adjacent to the first side seat portion;
a first inboard seat bolster having a first lateral side that extends adjacent to the first side seat portion and a second lateral side;
a second side seat portion having a second seating surface;
a second outboard seat bolster having a lateral side that extends adjacent to the second side seat portion;

a second inboard seat bolster having a first lateral side that extends adjacent to the second side seat portion and a second lateral side; and a generally rectangular intermediate seat portion having a generally rectangular intermediate seating surface and first and second lateral sides, the first lateral side of the intermediate seat portion being directly adjacent to the second lateral side of the first inboard seat bolster, and the second lateral side of the intermediate seat portion being directly adjacent to the second lateral side of the second inboard seat bolster;

wherein all of the lateral sides extend generally parallel to one another;

wherein the bolsters are movable between a retracted position, wherein the bolsters are all in a generally flush position relative to the first and second seating surfaces, and an extended position, wherein the bolsters are all in a non-flush position relative to the first and second seating surfaces; and wherein the entire intermediate seating surface of the intermediate seat portion is fixed in position relative to the bolsters.

10. The seat bottom defined in claim 9 wherein the first side seat portion is generally rectangular in shape.

11. The seat bottom defined in claim 10 wherein the first outboard seat bolster and the first inboard seat bolster are both generally rectangular in shape.

12. The seat bottom defined in claim 9 wherein the first and second side seat portions are each generally rectangular in shape.

13. The seat bottom defined in claim 12 wherein the bolsters are all generally rectangular in shape.

14. The seat bottom defined in claim 9 further including an actuator for moving the bolsters between the retracted and extended positions.

15. The seat bottom defined in claim 14 further including a sensor that generates a signal in response to a sensed condition, and wherein the actuator is responsive to the sensor signal for moving the bolsters between the retracted and extended positions.

16. The seat bottom defined in claim 15 wherein the sensor is responsive to one of lateral acceleration force, the number of occupants seated on the seat bottom, and the location of occupants seated on the seat bottom.

17. The seat bottom defined in claim 14 wherein the seat back further including an armrest that is movable between retracted and extended positions, and wherein the actuator is responsive to the position of the arm rest for moving the bolsters between the retracted and extended positions.

* * * * *